Figure 1:
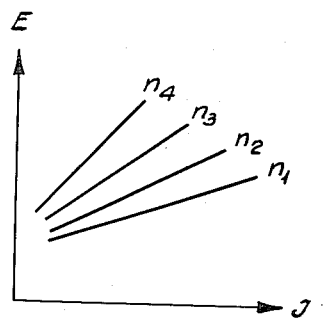

Aug. 30, 1955  U. LAMM  2,716,726

ELECTRIC MOTOR CONTROL DEVICE

Filed May 1, 1951

INVENTOR
UNO LAMM
BY *Eames Aiken*
ATTORNEY

_United States Patent Office_ 2,716,726
Patented Aug. 30, 1955

2,716,726

ELECTRIC MOTOR CONTROL DEVICE

Uno Lamm, Ludvika, Sweden, assignor to Allmanna Svenska Elektriska Aktiebolaget, Vasteras, Sweden, a corporation of Sweden Application May 1, 1951, Serial No. 223,879

Claims priority, application Sweden May 6, 1950

4 Claims. (Cl. 318—249)

In many applications of electric motors it is of special advantage to be able to utilize the constant or gradually descending speed as the load is increased, which is characteristic of shunt motors. Motors of that kind, however, have the disadvantage that their starting properties are not suitable when a high starting torque is required. For that reason it is advantageous to have for motors of other kinds a method of speed control giving a speed load characteristic mainly corresponding to that of a shunt motor and also having more favorable properties when starting or at heavy load.

This advantage may be obtained with a device using a transductor in series with a series motor whereby it can keep the speed mainly constant with varying load.

Primarily the present invention concerns the speed control of a series motor supplied with either direct current or single phase or three phase alternating current, but it is also applicable to more specialized motors having a series characteristic, such as repulsion motors, to which a number of special types may be added, for instance those of Thomson and Déri. In the following specification the term "series motor" refers to any of the above-mentioned types of motors.

One advantage of the invention is the possibility of utilizing the property of the series motor of response to an increase in torque. The torque of a shunt motor is mainly proportional to the armature current while the torque of a series motor is proportional to the square of the armature current, and for that reason an increase in the load torque involves a comparatively smaller increase in power with the latter type of motor. The series motor is thus very suitable in those cases where a high starting torque is required.

The motor voltage for a series motor varies substantially according to a curve which, for a certain speed, is a linear and increasing function of the motor current. It is often a disadvantage, however, that the speed of such a motor varies so much when changing the load, but this disadvantage is avoided when a transductor is used in series with the series motor, because the transductor can be made to follow said curve. In this way the series motor may be given a shunt characteristic, and at the same time the property of development of a high starting torque may be utilized. The advantage of using a transductor is that it may be controlled according to a certain program, i. e. to obtain the quotient between voltage and current, the speed, etc. In the known arrangements for controlling a series motor by means of a transductor series connected to it, the transductor is excited by a current derived only from the motor current. In that case, however, only a relatively narrow portion of the characteristic curve of the transductor may be utilized, and the known methods thus only permit the utilization of a rather limited speed range.

Figure 2:
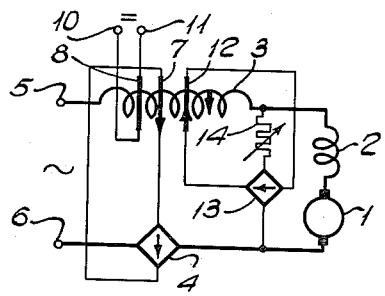
Figure 3:
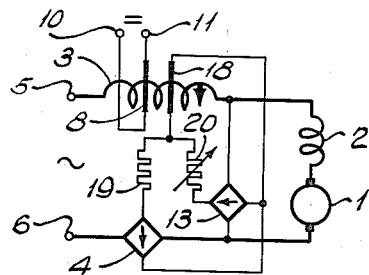

According to the present invention, the above disadvantage is avoided, and the invention will be further described in connection with the accompanying drawing, in which:

Fig. 1 shows the relation between current and voltage for a series motor at different speeds, and Figs. 2 and 3 diagrammatically show different forms of a device according to the invention.

In Fig. 1 the straight-lined relation is shown between the current and the voltage of a series motor at the speeds $n_1$ to $n_4$. A transductor excited by direct currents in a suitable way may be used to give these curves.

According to the form illustrated by Fig. 2, it is possible to obtain a large range for adjusting the speed. The motor 1 in this case is an alternating current motor with its field winding 2, connected in series with the transductor 3 and with a rectifier 4 to a source of alternating current at 5 and 6. The transductor 3 is excited by an excitation current through a winding 7 derived from the current through the motor 1 by means of the rectifier 4, and by an excitation current through a winding 8 supplied from a separate current source at the terminals 10 and 11. The transductor is furthermore provided with an excitation winding 12, the ampere-turns of which balance the ampere-turns of the excitation windings 7 and 8. The winding 12 is fed from a rectifier 13 connected to the voltage across the series motor 1. An adjustable resistor 14 is connected so as to control the excitation current through winding 12. In the arrangement shown, said resistor 14 is connected to the alternating current side of the rectifier 13, but it should be understood that other connections may suitably be used for the same purpose. The three excitation windings 7, 8 and 12, of which the windings 7 and 12 are suitably designed to give large counteracting ampere-turns, balance each other at a certain relation between current and voltage, i. e. for a certain speed which may be set by the resistor 14. By this connection the bend of the transductor curve will be of less importance, so that a wide range of speed may be covered. A further advantage is that the control accuracy will be greater than with the forms according to any of the arrangements heretofore known.

A direct current series motor may, of course, be controlled in a similar way, provided that it is connected to a rectifier connected in series with the transductor.

Fig. 3 shows another way of supplying to the transductor the excitation currents which are derived from the voltage across the motor, and from the motor current. The direct current circuits of the rectifiers 4 and 13 are joined in such a way that a differential current is obtained and is supplied to the winding 18. In a suitable manner certain resistors must be connected in the circuits, for example the resistors 19, 20 in series with each rectifier. One of these resistors should be adjustable, for example resistor 20 as shown.

What I claim is:

1. An electric motor system with a series motor and means for regulating the speed of the motor to a substantially constant value, comprising a series field winding for the motor, a transductor in series with said winding, and means for controlling said transductor by the difference between direct current components one of which components is derived from the voltage across the motor and another of which components is derived from the current traversing the motor.

2. An electric motor system according to claim 1, comprising means whereby another direct current component is applied to the transductor and is supplied with current by a substantially constant source of direct current.

3. An electric motor system according to claim 1, comprising means for adjusting the ratio between the motor current and the said direct current component derived from the motor current.

4. An electric motor system according to claim 1, comprising means for adjusting the ratio between the said motor voltage and the said direct current component derived from the voltage across the motor.

References Cited in the file of this patent

UNITED STATES PATENTS

| | | |
|---|---|---|
| Re. 21,407 | Croden | Mar. 26, 1940 |
| 1,917,146 | Nixdorff et al. | July 4, 1933 |
| 1,954,884 | Mears | Apr. 17, 1934 |
| 1,969,520 | Nagashev | Aug. 7, 1934 |
| 1,979,890 | Lee | Nov. 6, 1934 |
| 2,362,569 | Lobosco | Nov. 14, 1944 |
| 2,455,869 | Krabbe | Dec. 7, 1948 |
| 2,558,086 | Herchenroeder | June 26, 1951 |
| 2,558,094 | King | June 26, 1951 |

FOREIGN PATENTS

| | | |
|---|---|---|
| 361,107 | Great Britain | Nov. 19, 1931 |